July 19, 1932.  E. J. REAVES  1,868,254
FREE WHEELING DRIVE FOR AUTOMOBILES
Filed June 22, 1931
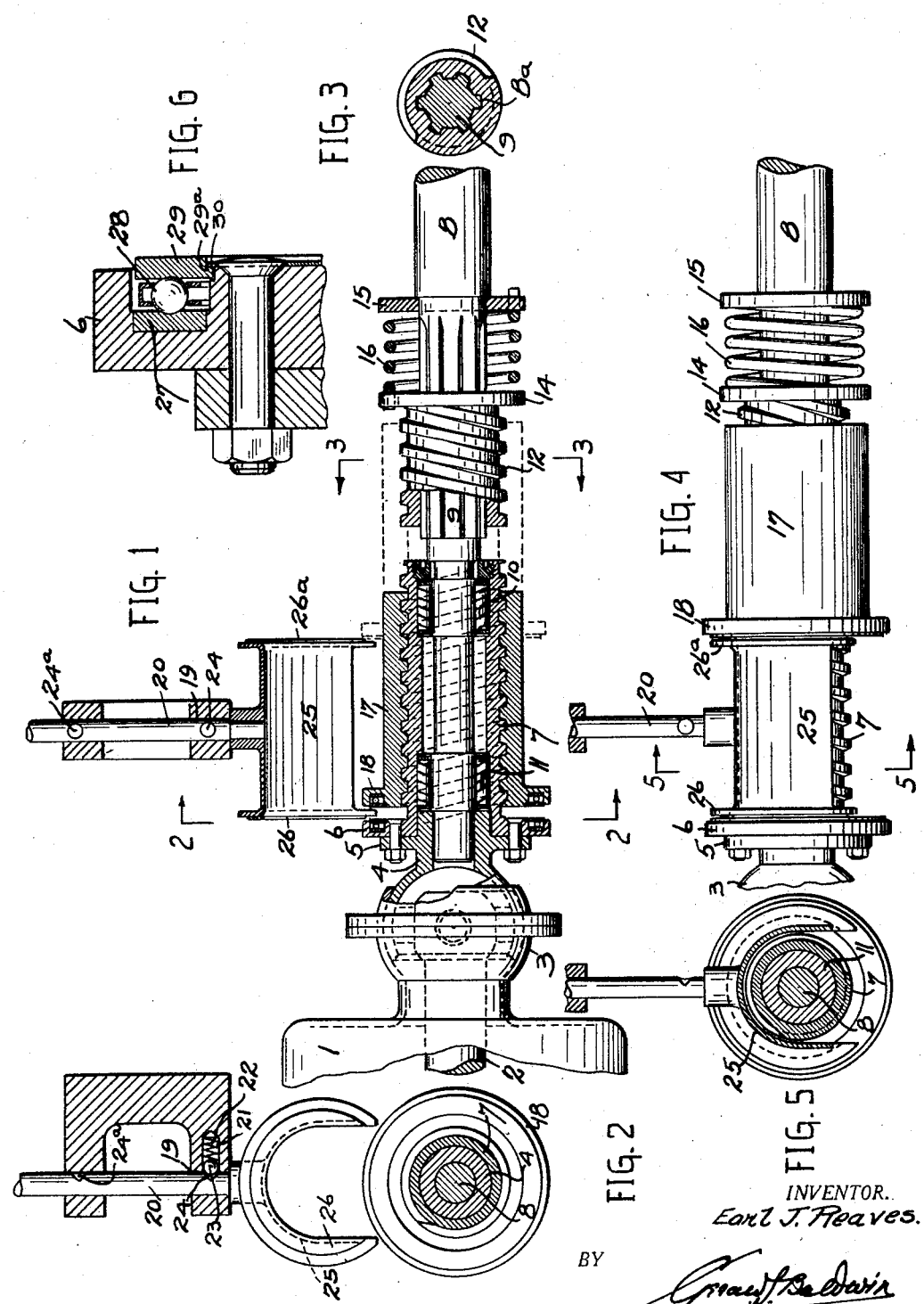
INVENTOR.
Earl J. Reaves.
BY
ATTORNEY.

Patented July 19, 1932

1,868,254

UNITED STATES PATENT OFFICE

EARL J. REAVES, OF DETROIT, MICHIGAN

FREE WHEELING DRIVE FOR AUTOMOBILES

Application filed June 22, 1931. Serial No. 545,907.

This invention relates to improvements in free wheeling drives for automobiles, and refers more particularly to a free wheeling drive which may be readily installed between a transmission and a differential drive without in any way altering either of the latter.

Another object of the invention is to provide a free wheeling drive for automobiles which is relatively cheap and simple to manufacture, install and operate.

With these and other objects and advantages in view which will become apparent as the specification proceeds, the invention is hereinafter more fully described with the aid of the accompanying drawing, in which:

Figure 1 illustrates a sectional view of the invention.

Figures 2 and 3 are sections on the lines 2—2 and 3—3 of Figure 1.

Figure 4 is a partial side elevation showing the mechanism so held that free wheeling cannot occur.

Figure 5 is a section on the line 5—5 of Figure 4, and

Figure 6 is an enlarged detail.

Referring to the drawing, 1 designates a portion of a conventional transmission housing from which a drive shaft 2 extends. The latter terminates in a universal joint 3 of any preferred construction, and from the outer side of the latter and integral therewith an annular stub shaft 4 projects. Secured to a collar 5 around the latter is a flange 6 integral with one extremity of a tubular drive shaft extension 7 which is externally threaded.

8 denotes a driven shaft having an intermediate splined portion 9 and one end rotatably supported in bearings 10 and 11 provided within the tubular drive shaft extension 7; moreover in the present case one extremity of the shaft 8 terminates in the annular stub shaft 4.

Axially slidable on the splined portion 9, and held against independent rotation by the splines, is a sleeve 12 which is externally threaded similarly to the tubular drive shaft extension 7. One extremity of the sleeve 12 terminates in a flange 14, and around the driven shaft 8 adjacent one end of its splined portion is a collar 15. Around the driven shaft between the flange 14 and the collar 15 a helical spring 16 is arranged which has one extremity suitably secured to the said flange and its opposite extremity secured to said collar, so that normally the sleeve 12 is held spaced from the collar 15 as shown in Figure 1.

Rotatable on the external thread of both the tubular drive shaft extension 7 and the sleeve 12 is a nut 17 which terminates at one extremity in an annular flange 18. When the nut 17 is positioned as shown in Figure 1, that is in threaded engagement with the tubular drive shaft extension 7 only, the driven shaft 8 is free to turn independently of the drive shaft 2; but when the nut 17 is in threaded engagement both with the tubular drive shaft extension 7 and the sleeve 12 then the drive shaft 1 and the driven shaft 8 must rotate together.

Through a bearing indicated at 19 a rod 20 is vertically movable. Moreover suitable means are preferably provided in the bearing 19 for holding the said rod against accidental vertical movement. This usually consists of a cavity 21 formed in the bearing 19 and having a spring 22 therein which exerts outward pressure against a ball 23, so that the latter tends to engage either of the recesses 24 or 24a formed in the side of the rod 20. Mounted on the lower extremity of the latter is a bifurcated spacing member 25 having flanges 26 and 26a at its opposite extremities. When the nut 17 is in the position shown in Figure 1 the spacing member is held in its upper position, but when it is desired to retain the nut 17 in threaded engagement both with the sleeve 12 and the adjacent end of the tubular shaft extension 7 then the spacing member is lowered into the position shown in Figure 4, in which case the flanges 26 and 26a rest against the flanges 6 and 18 respectively. In order to reduce the friction between the flanges 26 and 6, and 26a and 18 the flanges 6 and 18 are preferably provided with a ball thrust arrangement on their adjacent faces. Insomuch that the arrangement is the same on both flanges I will describe in detail the arrangement on the flange 6, an enlarged detail of which is shown in Figure 6.

In one face of the flange 6 an annular recess is formed to receive a hardened ring 27 which is preferably a tight fit therein. Against this ring a ball thrust ring 28 is placed, and 29 denotes a second hardened ring which is annularly recessed at 29a and is held against the face of the thrust ring 28 by a flange 30. Thus rotation of the flange 6 is not materially impeded by the flange 26 when the latter rests against the ring 29.

The operation of the device is briefly as follows: When the drive shaft 2 commences to turn the tubular drive shaft extension 7 is also rotated. This rotation causes the nut 17 to be moved axially towards the flange 14 and engage the externally threaded sleeve 12. As soon as this occurs the driven shaft 8 is also rotated on account of the spline connection between the keyways 8a in the sleeve 12 and the splined shaft portion 9. The purpose of the flange 14 and spring 16 is to prevent undue travel of the nut 17 and to gradually stop the rotation of the latter if it travels too far or too fast along the sleeve 12.

When the drive shaft 2 is idling the speed of rotation of the driven shaft 8, due to the rotation of the rear wheels of the vehicle (not shown), exceeds that of the said drive shaft and its extension 7; then the nut 17 travels towards the universal joint 3 until it is completely off the sleeve 12. Then independent rotation of the drive and driven shafts 2 and 8 may occur.

When it is desired to utilize the braking effect of the engine or to travel backwards, the shaft 2 is first rotated with the transmission in forward gear until the nut 17 has engaged the sleeve 12 and the member 25 has been lowered. Then the free wheeling feature has been rendered inoperative and remains so until the said member 25 is again raised and the nut 17 is again free to travel axially along the shaft extension 7 and the sleeve 12.

While in the foregoing the preferred embodiment of the invention has been described and shown it is understood that the construction is susceptible to such alterations and modifications as fall within the scope of the appended claims.

What I claim is:

1. In an arrangement of the character described, the combination of a drive shaft having an externally threaded extension, a driven shaft supported in axial alignment with said extension, a sleeve on said driven shaft rotatable with the latter and provided with an external thread similar to the thread on said extension, a nut in threaded engagement with said extension adapted also to engage said sleeve so that then the extension and driven shaft turn together, and means adapted to retain said nut in threaded engagement with both said extension and said sleeve.

2. In an arrangement of the character described, the combination of a drive shaft having an externally threaded tubular extension, a driven shaft one extremity of which is rotatably supported in said tubular extension, a sleeve on said driven shaft rotatable with the latter and provided externally with a thread similar to that on said extension, a nut in threaded engagement with said extension adapted also to engage said sleeve so that the extension and the driven shaft then turn together, and means adapted to retain said nut in threaded engagement with both said extension and said sleeve.

3. In an arrangement of the character described, the combination of a drive shaft having an externally threaded extension, a driven shaft supported in axial alignment with said extension, a sleeve axially slidable on said driven shaft and rotatable with the latter, said sleeve having an external thread thereon similar to the thread on said extension, a nut in threaded engagement with said extension adapted also to engage said sleeve so that then the extension and driven shaft turn together, spring means to retard the movement of said sleeve away from said nut as the latter engages the former and means adapted to retain said nut in threaded engagement with both said extension and said sleeve.

4. An arrangement of the character described comprising a drive shaft having an externally threaded extension, a flange at one extremity of said extension, a driven shaft supported in axial alignment with said extension, a sleeve threaded externally similarly to said extension mounted on the driven shaft so as to rotate therewith, a nut in threaded engagement with said extension and adapted also to engage said sleeve thread, and a flange at one extremity of said nut, said nut flange being adapted either to lie adjacent to or spaced from said extension flange, in combination with a vertically movable spacing member adapted to extend between said extension flange and said nut flange when said nut is in threaded engagement with said sleeve and hold the nut in such position that through it the drive and driven shafts must turn together.

5. In an arrangement of the character described, the combination of a drive shaft having an externally threaded tubular extension, a driven shaft one extremity of which is rotatably supported in said tubular extension, a sleeve axially slidable on said driven shaft and rotatable therewith, said sleeve being externally threaded similarly to said extension, a flange at one extremity of said sleeve, a collar around said driven shaft, a helical spring around said driven shaft extending between said collar and said flange, a nut in threaded engagement with said extension adapted, when the drive shaft is turned, to move axially and engage said sleeve thread, said nut being adapted to disengage itself from the sleeve when the speed of rotation of the driven shaft exceeds that of said drive shaft, and means, when said nut is in engagement with said sleeve, for preventing disengagement of said nut and sleeve so that then the drive and driven shafts must turn together.

6. In an arrangement of the character described, the combination of a drive shaft having an externally threaded extremity, a driven shaft, an externally threaded sleeve thereon rotatable with said driven shaft, a flange on said drive shaft, a nut in threaded engagement with said drive shaft threaded extremity, a flange at one extremity of said nut, said nut being adapted to engage the threaded sleeve, a spacing member adapted to extend between the drive shaft flange and the nut flange when the nut is in engagement with said sleeve, flanges on said spacing member ends, and ball thrust rings on the adjacent faces of said drive shaft and nut flanges.

7. In an arrangement of the character described, the combination of a drive shaft, a tubular externally threaded extension at one extremity of said shaft, a driven shaft one extremity of which is revolvably mounted in said tubular extension, a collar on said driven shaft, a sleeve axially movable on said driven shaft, a flange at one extremity of said sleeve, a spring extending between said flange and collar, a flange around the inner end of said extension, a nut in threaded engagement with said extension said sleeve having an external thread which said nut is adapted to engage, a vertically movable spacing member, flanges at the extremities of said member, and separate means on the adjacent faces of said extension flange and said nut for reducing the friction of said parts against the spacing member flanges when the latter is in lowered position and the nut is held in engagement with the sleeve thread thereby.

EARL J. REAVES.